(12) United States Patent
Godbole et al.

(10) Patent No.: US 10,673,755 B1
(45) Date of Patent: *Jun. 2, 2020

(54) MULTI-CHASSIS LINK AGGREGATION GROUPS WITH MORE THAN TWO CHASSIS

(71) Applicant: Juniper Networks, Inc., Sunnyvale, CA (US)

(72) Inventors: Avanindra Godbole, San Jose, CA (US); Xiangwen Xu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,675

(22) Filed: May 10, 2019

Related U.S. Application Data

(63) Continuation of application No. 14/319,877, filed on Jun. 30, 2014, now Pat. No. 10,291,521.

(51) Int. Cl.
*H04L 12/741* (2013.01)

(52) U.S. Cl.
CPC .................................. *H04L 45/74* (2013.01)

(58) Field of Classification Search
None
See application file for complete search history.

(56) References Cited

U.S. PATENT DOCUMENTS

| 7,606,154 | B1 | 10/2009 | Lee |
| 8,792,501 | B1 | 7/2014 | Rustagi et al. |
| 8,798,056 | B2 * | 8/2014 | Ganga .................. H04L 45/745 370/392 |
| 2006/0245438 | A1 * | 11/2006 | Sajassi .................. H04L 12/18 370/399 |
| 2012/0033672 | A1 | 2/2012 | Page et al. |
| 2012/0294154 | A1 * | 11/2012 | Missett .............. H04L 43/0811 370/241.1 |
| 2013/0028135 | A1 | 1/2013 | Berman |
| 2013/0064102 | A1 | 3/2013 | Chang et al. |

(Continued)

OTHER PUBLICATIONS

IEEE Std. 802.1ad-2005, "Virtual Bridged Local Area Networks," Amendment 4: Provider Bridges, IEEE Computer Society, May 26, 2006, 74 pgs.

(Continued)

*Primary Examiner* — Shripal K Khajuria
(74) *Attorney, Agent, or Firm* — Shumaker & Sieffert, P.A.

(57) ABSTRACT

In one example, a network device comprising a first chassis of a multi-chassis link aggregation group (MC-LAG) having three or more chassis, comprises one or more network interfaces configured to receive a packet to be forwarded using the MC-LAG, and a control unit configured to determine whether the packet was received from a device outside of the MC-LAG, when the packet was received from the device outside of the MC-LAG, add data to the packet that identifies the first chassis as a source of the packet for the MC-LAG, and forward the packet via at least one of the network interfaces. In this manner, chassis of the MC-LAG can prevent forwarding of the packet to the source of the packet for the MC-LAG, based on the data that identifies a source of the packet for the MC-LAG.

17 Claims, 4 Drawing Sheets

(56) References Cited

U.S. PATENT DOCUMENTS

| | | | |
|---|---|---|---|
| 2013/0064137 A1* | 3/2013 | Santoso | H04L 49/70 370/254 |
| 2013/0077621 A1 | 3/2013 | Jacob Da Silva et al. | |
| 2013/0215896 A1 | 8/2013 | Beecroft et al. | |
| 2013/0336317 A1 | 12/2013 | Mithyantha et al. | |
| 2014/0056176 A1* | 2/2014 | Ramesh | H04L 45/02 370/255 |
| 2014/0204760 A1* | 7/2014 | Durrani | H04L 47/41 370/236 |
| 2014/0269710 A1 | 9/2014 | Sundaram et al. | |
| 2015/0188760 A1 | 7/2015 | Anumala et al. | |
| 2015/0195178 A1 | 7/2015 | Bhattacharya et al. | |
| 2015/0256405 A1 | 9/2015 | Janardhanan et al. | |
| 2016/0065463 A1 | 3/2016 | Wang et al. | |

OTHER PUBLICATIONS

IEEE Std. 802.3ad-2000, "Amendment to Carrier Sense Multiple Access with Collision Detection (CSMA/CD) Access Method and Physical Layer Specifications—Aggregation of Multiple Link Segments", 2000, 182 pgs. [Note: although a month is not provided for this document, Applicant respectfully notes that the year of publication is sufficiently earlier than the effective U.S. filing date and any foreign priority date so that the particular month of publication is not in issue.].

Prosecution History from U.S. Appl. No. 14/319,877, dated Oct. 14, 2016 through Jan. 17, 2019, 200 pp.

\* cited by examiner

MULTI-CHASSIS LINK AGGREGATION GROUPS WITH MORE THAN TWO CHASSIS

This application is a continuation of U.S. application Ser. No. 14/319,877, filed Jun. 30, 2014, the entire contents of which are hereby incorporated by reference.

TECHNICAL FIELD

This disclosure relates to network devices and, more particularly, to network devices that provide link aggregation.

BACKGROUND

In computer networks, a network device may be connected to one or more network devices via two or more physical links. The term "link" is often used to refer to the connection between two devices on a network. The link may be a physical medium, such as a copper wire, a coaxial cable, any of a host of different fiber optic lines, or a wireless connection. In addition, network devices may define "virtual" or "logical" links, and map the virtual links to the physical links. In some cases, these two or more links may be logically grouped or aggregated together to form an "aggregated bundle." For example, one or more routers may be connected to a customer edge device via an aggregate bundle of multiple physical links. In some cases, Ethernet links may be combined into one logical interface for higher bandwidth and redundancy. Ports of the Ethernet links that are combined in this manner are referred to as a link aggregation group (LAG) or bundle.

Generally, link aggregation may improve bandwidth in comparison to that of a single link, while also providing connection redundancy. That is, aggregation of links into logical bundles may result in an available bandwidth of all of the aggregated links combined. In addition, should one of the links of the aggregated bundle fail, the network device may begin sending traffic to the other network device across the non-failed links of the aggregated bundle, thereby providing redundancy in the form of redundant links for delivery of traffic between two devices.

In one example implementation, a customer network site may be given redundant connectivity to a network through multiple provider edge (PE) routers. This form of redundancy is referred to as "multi-homing." In one type of multi-homing, referred to as "active-standby," one of the multiple PE routers coupled to the customer network is chosen as the active PE router, or designated forwarder, to send traffic to and from the customer network. The other one or more PE routers are designated as backup forwarders which can be used to send traffic to and from the customer network in the event of a network failure that would preclude the current designated forwarder from sending the traffic. As such, in "active-standby" multi-homed deployments, the standby link is only used when the active link is disabled. In an "active-active" multi-chassis link aggregation group (MC-LAG) configuration, each of the PE routers is configured to actively forward traffic, and the multiple, physical links providing the multi-homed connectivity are logically aggregated and treated as a single, logical link.

SUMMARY

In general, this disclosure describes techniques for implementing a multi-chassis link aggregation group (MC-LAG) having three or more chassis. A problem that may arise in conventional MC-LAG techniques, when attempting to provide more than two chassis in the MC-LAG is that there would not be a way for a given one of the multiple chassis to determine a source chassis of the MC-LAG for a packet to be forwarded using the MC-LAG That is, in a two-chassis MC-LAG each chassis can determine whether a packet was received via a port coupled to the other chassis of the MC-LAG to determine which chassis is the source of the packet for the MC-LAG In three or more chassis MC-LAGs, however, this determination could not be performed in the same way, e.g., because the chassis may not be directly connected (that is, two of the chassis may be indirectly coupled by one or more intermediate chassis). In order to prevent a packet from being sent back to a source of the packet, a chassis of the MC-LAG must be able to determine the source, e.g., to prevent network loops. Thus, MC-LAGs are commonly limited to two chassis.

This disclosure, however, describes techniques by which a three-or-more chassis MC-LAG can be formed. In particular, a source chassis of a packet for an MC-LAG inserts data that identifies the source chassis to the packet. As explained below, the data may further identify, e.g., the MC-LAG itself, a virtual local area network (VLAN), and/or other network elements. In one example, the source chassis inserts the data into an Ethernet tag carried by the packet. The data of the Ethernet tag may represent both an identifier of the source chassis and an identifier of the MC-LAG Thus, chassis of the MC-LAG may use this added data to determine a source of the packet for the MC-LAG In this manner, chassis can avoid forwarding the packet back to the source of the packet for the MC-LAG; which may prevent network loops.

In one example, a method includes receiving, by a first chassis of a multi-chassis link aggregation group (MC-LAG) having three or more chassis, a packet to be forwarded using the MC-LAG, determining whether the packet was received from a device outside of the MC-LAG, when the packet was received from the device outside of the MC-LAG, adding data to the packet that identifies the first chassis as a source of the packet for the MC-LAG, and forwarding the packet.

In another example, a network device includes a first chassis of a multi-chassis link aggregation group (MC-LAG) having three or more chassis, and the network device includes one or more network interfaces configured to receive a packet to be forwarded using the MC-LAG, and a control unit configured to determine whether the packet was received from a device outside of the MC-LAG, when the packet was received from the device outside of the MC-LAG, add data to the packet that identifies the first chassis as a source of the packet for the MC-LAG, and forward the packet via at least one of the network interfaces.

In another example, a system includes a plurality of chassis forming a multi-chassis link aggregation group (MC-LAG), wherein the plurality of chassis includes at least three chassis, and wherein the plurality of chassis comprises a first chassis, and a second chassis, wherein the first chassis is configured to receive a packet to be forwarded using the MC-LAG from a device outside of the MC-LAG, to add data to the packet that identifies the first chassis as a source of the packet for the MC-LAG based on a determination that the packet was received from the device outside of the MC-LAG, and to forward the packet to the second chassis, and wherein the second chassis is configured to forward the packet based at least in part on the data that identifies the first chassis as the source of the packet for the MC-LAG.

In another example, a computer-readable medium, such as a computer-readable storage medium, contains, e.g., is encoded with, instructions that cause a processor of a first chassis of a multi-chassis link aggregation group (MC-LAG) having three or more chassis to receive a packet to be forwarded using the MC-LAG, determine whether the packet was received from a device outside of the MC-LAG, when the packet was received from the device outside of the MC-LAG, add data to the packet that identifies the first chassis as a source of the packet for the MC-LAG, and forward the packet.

The details of one or more examples are set forth in the accompanying drawings and the description below. Other features, objects, and advantages will be apparent from the description and drawings, and from the claims.

DETAILED DESCRIPTION

Figure 1:
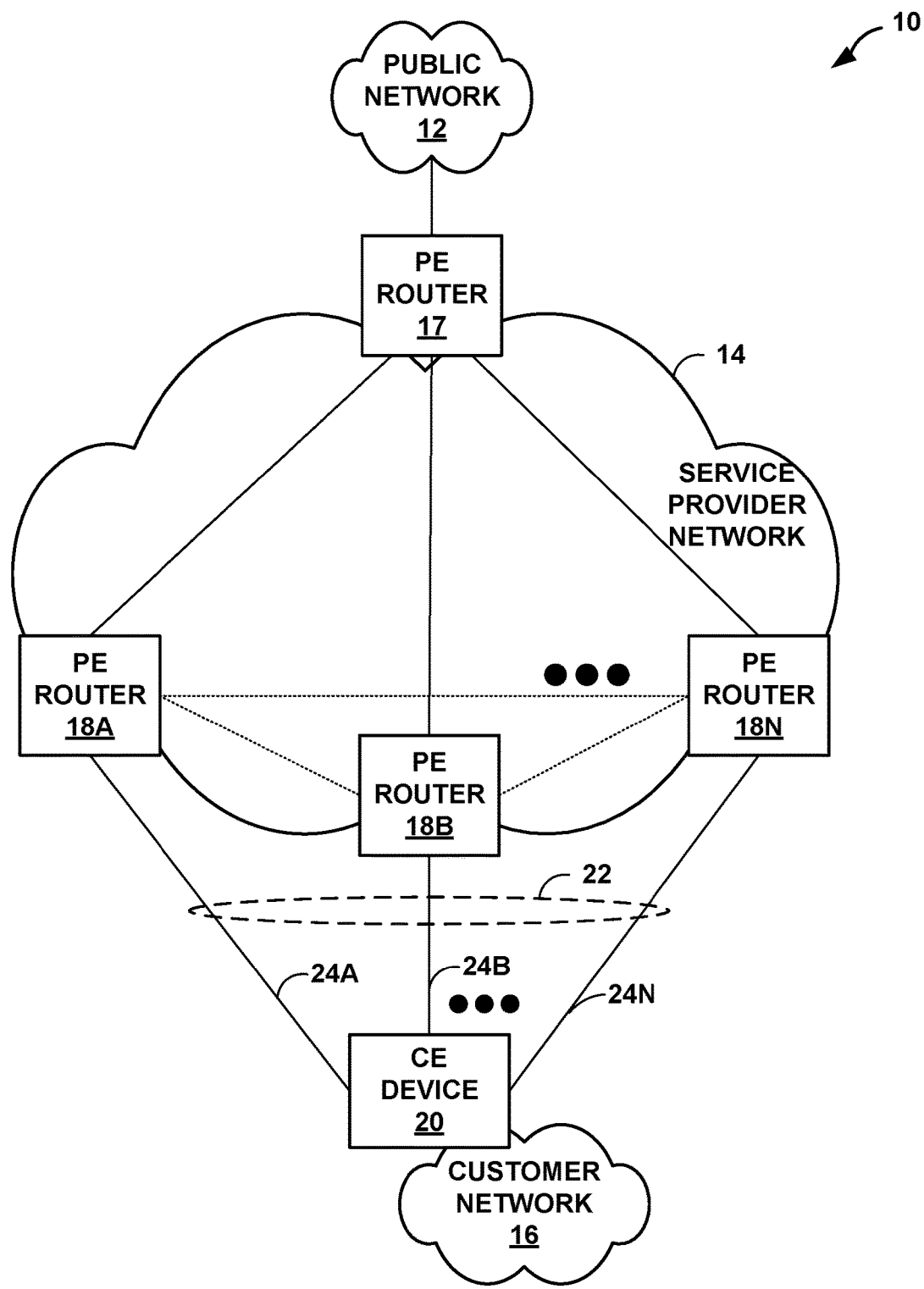
FIG. 1 is a block diagram illustrating an example network system that implements various aspects of the techniques described in this disclosure.

FIG. 1 is a block diagram illustrating an example network system 10 that implements various aspects of the techniques described in this disclosure. In the example of FIG. 1, network system 10 includes a public network 12, a service provider network 14 and a customer network 16. While shown as including public network 12, service provider network 14 and customer network 16, network system 10 is merely one example of the type of network system in which the techniques of this disclosure may be performed. Although not shown in the example of FIG. 1, network system 10 may include additional service provider networks, customer networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to customer networks.

Public network 12 represents a network that is generally publically accessible by any network-capable device having a network connection. Public network 12 may represent a network that is commonly referred to as the Internet, which refers to a public layer three (L3) packet-switched network (where reference to a layer followed by a number in this disclosure refers to the corresponding layer in the Open Systems Interconnection (OSI) model). Although not shown in the example of FIG. 1, public network 12 typically includes a collection of interconnected network devices, such as data servers, application servers, print servers, laptop computers, desktop computers, workstations, cellular phones (including so-called "smart phones"), routers, switches, and hubs. While described as being publically available, public network 12 is, in some examples, only accessible by network-capable devices that have an active network connection, where such network connections are commonly provided by service provider networks, such as service provider network 14 in the form of what is typically referred to as a "data service."

Service provider network 14 represents one or more networks owned and operated by a service provider (which is commonly a private entity) that offer one or more services for consumption by customer networks, such as customer network 16. Service provider network 14 is typically a L3 packet-switched network that provides L3 connectivity between public network 12 and customer network 16. Often, this L3 connectivity provided by service provider network 14 is marketed as a data service or Internet service, and subscribers may subscribe to this data service. Recently, services provided by way of different types of networks from the service provider's L3 packet-switched network, such as telephone service or television service, are being provided via the service provider's L3 packet-switched network in the form of VoIP, video on demand (VoD) and IPTV, respectively. As a result, service provider network 14 may provide what is referred to as a "triple-play package" of services that include each of data, voice and television services over the L3 packet-switched network. Thus, service provider network 14 may represent a L3 packet-switched network that provides data, voice, television and any other type of service for purchase by subscribers and subsequent consumption by customer network 16. Service provider network 14 may provide other services in addition to or in the alternative to the services discussed above, such as, for example, a virtual private local area network service (VPLS).

Customer network 16 may represent a network owned and operated by a subscriber of one or more of these services provided by service provider network 14. Although not shown in the example of FIG. 1 for ease of illustration purposes, customer network 16 may include one or more network-capable devices, such as network-capable printers, servers, laptop computers, desktop computers, cellular phones (including smart phones), tablet or slate computers, netbooks, personal media players, game consoles, network-capable high definition disk players (such as a Blu-ray disc player), digital video disc players, Internet-ready televisions, and electronic reading devices.

The subscribers that own and operate customer network 16 may subscribe to one or more services from the service provider that owns and operates service provider network 14, where such subscriber agreements generally indicate a level of service, quality of service or class of service with which the service provider generally agrees to provide each of the one or more services. For example, one of the subscribers that owns and operates a corresponding one of customer network 16 may subscriber to a data service of a particular bandwidth, such as 10 megabits per second (Mbps) usually at a class of service lower than that to which the service provider agrees to provide less latency tolerant services, such as IPTV or VoIP. In some instances, the service provider may agree to provide all services to which the subscriber subscribes at a given class of service. Whether on an individual service basis or a subscriber basis, the service provider generally agrees to provide services to which any given one of its subscribers according to an agreed upon class of service.

In order to provide these services in accordance with the agreed upon one or more classes of service, network devices of service provider network 14 that forward traffic corresponding to these services implement scheduling algorithms to schedule this subscriber traffic for delivery downstream (meaning, from public network 12 to customer networks 16) to customer networks 16 in a manner that delivers this traffic to meet the one or more classes of services associated with this subscriber. These scheduling algorithms may include a weighted fair queuing (WFQ) algorithm. However, WFQ algorithms are generally difficult to implement in that it requires substantial computations to correctly implement WFQ. Thus, the scheduling algorithms may include approximate WFQ algorithms, such as a Weighted Round-Robin (WRR) scheduling algorithm and a Deficit Round-Robin (DRR) scheduling algorithm. Alternatively, the scheduling algorithm may include the scheduling algorithm set forth in U.S. Pat. No. 7,606,154, entitled "Fair Bandwidth Allocation Based on Configurable Service Classes," filed Apr. 1, 2004, which is hereby incorporated by reference as if set forth in its entirety herein. These scheduling algorithms seek to schedule traffic in a manner that fairly allocates bandwidth to each data flow such that class of service agreements may be met while also meeting any latency requirements, which may also form a part of the class of service.

As further shown in the example of FIG. 1, service provider network 14 includes network devices, such as routers 18A-18N ("routers 18") and router 17. Routers 18 may each represent any network device that routes or otherwise forwards traffic to/from service provider network 14 and customer network 16, while router 17 represents any network device that routes or otherwise forwards traffic to/from service provider network 14 and public network 12. Typically, each of routers 17, 18 represents an L3 packet-switching device that operates to receive routing information describing a current topology of service provider network 14. Routers 17, 18 may then process this routing information, selecting paths through its representation of the topology of service provider network 14 to reach all available destinations to generate forwarding information. In other words, routers 17, 18 reduce these paths to so-called "next hops," which identify interfaces by which traffic destined for a particular destination is to be forwarded, where the forwarding information includes this list of next hops. Each of routers 17, 18 then installs this forwarding information in a forwarding plane of the respective one of routers 17, 18, whereupon the forwarding plane forwards received traffic in accordance with the forwarding information.

As further shown in the example of FIG. 1, customer network 16 includes a customer edge (CE) device 20 ("CE device 20"), which may represent any network device capable of interfacing with service provider network 14 to forward traffic to and receive traffic from service provider network 14. Typically, CE device 20 is a L2 network device commonly referred to as a "switch" that switches (rather than routes) traffic from customer network 16 to service provider network 14 and from service provider network 14 to customer network 16.

As descried in greater detail below, this disclosure describes techniques by which a multi-chassis link aggregation group (MC-LAG) may include three or more chassis. Whereas conventionally, MC-LAGs were limited to two chassis, this disclosure describes techniques by which an MC-LAG may include three chassis. Routers 18 represent an MC-LAG including at least three chassis. Although only three chassis are shown in FIG. 1, it should be understood that in other examples, an MC-LAG may include any number of chassis, in accordance with the techniques of this disclosure.

Often, for large customers that operate relatively larger customer networks, service providers employ what is referred to as "aggregated bundles" to interconnect routers and CE devices via two or more links. Example aggregated bundles include aggregated Ethernet bundles, which may be configured and maintained using a link aggregation control protocol (LACP), as defined in IEEE 802.3ad, entitled "Aggregation of Multiple Link Segments," the contents of which are incorporated herein by reference. Logically, these aggregated bundles appear as a single connection to the router and/or the CE device. Aggregated bundles provide a number of benefits. First, aggregated bundles may provide redundancy of connection between the routers and CE devices. To illustrate, should one of the link of the aggregated bundle fail, the router and CE device interconnected by the aggregated bundle may redirect traffic previously being sent over the failed links of the aggregated bundle to one of the active links of the aggregated bundle, thereby providing redundancy of connection between a router and a CE device.

Second, use of aggregated bundles may provide increased network capacity (which is often measured in terms of bandwidth) considering that the multiple links of the aggregated bundle may be employed to deliver traffic rather than a single link. Third, aggregated bundles may promote bandwidth scalability in that a service provider may establish an aggregated bundle with two links, as one example, and then incrementally increase the number of links in the aggregated bundle in response to increased subscriber bandwidth demand. In this manner, the service provider may slow capital outlays by only providing sufficient bandwidth to meet current subscriber bandwidth demand rather than expected future subscriber bandwidth demand. Further exemplary details of multi-chassis link aggregation are described in U.S. patent application Ser. No. 13/162,157, entitled "ACTIVE-ACTIVE MULTI-HOMING WITH MULTI-CHASSIS PSEUDOWIRE LINK AGGREGATION," the entire contents of which are hereby incorporated by reference.

In the example of FIG. 1, routers 18 work in conjunction with one another to provide MC-LAG 22 (which may also be referred to as "aggregated bundle 22"). That is, MC-LAG 22 corresponds to an aggregation of links 24A-24N between respective PE routers 18 and CE device 20. While described as being provided by separate routers, i.e., routers 18 in the example of FIG. 1, MC-LAG 22 may be provided by a single device having multiple chassis, as briefly noted above, in which case routers 18 may represent different chassis of the multi-chassis router. Accordingly, the techniques described in this disclosure should not be limited in this respect to the particular example of FIG. 1.

There are generally two types of aggregated bundles. The first type is typically referred to as active/active aggregated bundles, where both of routers 18 are "active" in that they receive and route traffic over each of their respective links that form MC-LAG 22. The second type of aggregated bundles is referred to as active/standby aggregated bundles, where only a subset of routers 18 are active and the remaining ones of routers 18 are in a standby mode. Those of routers 18 in the standby mode may become active when one or more of the active routers 18 fails. While the techniques are described below with respect to an active/active MC-LAG 22, the techniques may also be implemented with respect to active/standby aggregated bundles to facilitate identification of failed devices that provide the active/standby aggregated bundles.

Routers 18 may be configured to participate in signaling for and maintain L2 state information for customer network 16. That is, routers 18 may act as members of a domain of customer network 16. For example, if customer network 16 forms a virtual private local area network service (VPLS), routers 18 in BGP-based VPLS signaling for customer network 16.

This disclosure recognizes that the conventional limiting factor that prevented an MC-LAG from including more than two chassis is that, if a packet were received by a device of an MC-LAG having three or more chassis, there would be no way to determine which devices of the MC-LAG had already received the packet. Suppose, for instance, that router 18A received a packet to be forwarded as part of MC-LAG 22. Router 18A may forward the packet to router 18B, which may forward the packet to router 18N. In this scenario, router 18N may be configured such that the packet is to be forwarded as part of MC-LAG 22. However, absent the techniques of this disclosure, router 18N would not have any information indicating that router 18A had received the packet previously. In this case, router 18N may forward the packet back to router 18A, which would cause the packet to be forwarded back to its source. This may result in a loop being formed among routers 18.

An MC-LAG is a type of LAG with ports that may terminate on a separate chassis. It is an extension of IEEE 802.1ad, May 26, 2006. Various vendors have respective, proprietary implementations of this technique. Implementations of MC-LAG are often limited to two chassis, outside the techniques of this disclosure. Consider a given chassis, which has a port member on a MC-LAG. For some types of forwarding such as layer 2 flooding, before transmitting a packet on this port, this chassis must first determine that the packet was not received on the same LAG, possibly on a port connected to some other chassis. In case of 2 chassis, this chassis can observe whether the packet arrived from its directly-connected neighboring chassis, or whether it arrived from a local port. This can be used to make the transmit decision. However, if there are more than two chassis, simply observing on which local port the packet arrived is not enough to make a transmit decision. Therefore, most vendors limit MC-LAG to 2 chassis. Members involved in IEEE 802.1AXbq are working on this topic. The main data plane problem is attaching an interface identifier to the packet as it enters the MC-LAG system, using that identifier to make forwarding decisions. Control plane software may be used to program the data plane.

Routers 18 may be configured in accordance with the techniques of this disclosure to address the scenario discussed above. In particular, when a device of an MC-LAG receives a packet to be forwarded according to the MC-LAG, the device may add data to the packet, referred to in this disclosure as a source identifier (or "SourceID"). The SourceID includes data that identifies a source of the packet. Suppose, for example, that router 18A receives a packet to be forwarded according to MC-LAG 22. Router 18A may add data that identifies router 18A as the source of the packet, i.e., the device of the MC-LAG that originally received the packet. Router 18A may add the SourceID value based on a port of router 18A by which the packet was received.

The SourceID may also include data that identifies MC-LAG 22. In some examples, the SourceID may be a single value that represents both the source device of the MC-LAG and the MC-LAG itself. Routers 18 may be configured with look-up tables that map such values to source device/MC-LAG pairs.

The SourceID value may be added in the form of an Ethernet tag. In general, an Ethernet tag may be specified for particular EtherType values for an Ethernet frame, e.g., an EtherType value of 0x8100. Routers 18 may encode an EtherType value indicating that the Ethernet tag is a virtual local area network (VLAN) tag, and add the SourceID value as a field (e.g., in the form of a VLAN tag or another type of tag as indicated by the EtherType value). For example, the value of the field may represent an identity of the one of routers 18 (e.g., router 18A) that received the packet for MC-LAG 22 and may represent MC-LAG 22. The EtherType value, in other examples, may be a proprietary tag protocol identifier (TPID) value. Routers 18 may be configured to add or otherwise manipulate Ethernet tags as part of the Ethernet header for the packet.

In general, the techniques of this disclosure are described as including adding data to a packet, e.g., adding an Ethernet tag to a packet. It should be understood that the term "packet" may in fact refer to an Ethernet frame. The Ethernet tag may correspond to a virtual local area network (VLAN) tag, i.e., an IEEE 802.1Q VLAN header. In accordance with IEEE 802.1ad, multiple VLAN tags may be added to an Ethernet frame. Thus, the techniques of this disclosure may include adding an additional VLAN tag that includes data for the SourceID as discussed herein.

Accordingly, routers 18 may determine, upon receiving a packet, whether the packet includes a SourceID value. For instance, when router 18A first receives a packet, router 18A determines whether the packet includes a SourceID value. In the case that the packet does not include a SourceID value, but is to be forwarded according to MC-LAG 22, router 18A adds a SourceID value to the packet, where the SourceID value indicates that router 18A is the source of the packet for MC-LAG 22.

On the other hand, if the packet already has a SourceID value, router 18A determines how to forward the packet based at least in part on the SourceID value. For instance, if the packet includes a SourceID value that identifies router 18C as a source of the packet for MC-LAG 22, router 18A avoids sending the packet to router 18C. To avoid sending the packet to router 18C in this example, router 18A may prune a spanning tree, formed according to the spanning tree protocol, based on the source of the packet as indicated by the SourceID value. The Spanning Tree Protocol is described in IEEE 802.1d-1998, and the Rapid Spanning Tree Protocol is described in IEEE 802.1d-2004. In the case that router 18A receives a packet including a SourceID value and router 18A is acting as an egress router for MC-LAG 22 (e.g., if router 18A is a designated forwarder for MC-LAG 22), router 18A removes the SourceID value before forwarding the packet, e.g., to CE device 20.

As discussed above, routers 18 are shown as distinct devices in service provider network 14 for purposes of example. It should be understood that in other examples, one or more of routers 18 may be included in a single multi-chassis device. When forming an MC-LAG, one or more chassis may be included in the same device, and/or one or more chassis may be realized as separate devices, as illustrated in FIG. 1. Accordingly, an MC-LAG such as MC-LAG 22 may be formed by all different devices, a single device including multiple chassis, or any combination of multiple devices and one or more devices having multiple chassis. Thus, routers 18 may also be referred to as chassis.

In accordance with the techniques of this disclosure, router 18A, as an example, may act as a first chassis of an MC-LAG, e.g., MC-LAG 22, having three or more chassis. Router 18A may receive a packet to be forwarded using MC-LAG 22. For instance, a forwarding information base (FIB) of a forwarding plane of router 18A may be configured to indicate that a packet having a header conforming to a particular network five-tuple (source Internet protocol (IP) address, destination IP address, source port, destination port, and protocol) is to be forwarded using MC-LAG 22.

Router 18A may then determine whether the packet was received from a device outside of the chassis forming router 18A. For instance, router 18A may determine whether the packet was received from router 17. Additionally or alternatively, router 18A may determine whether the packet includes a SourceID value that specifies a source of the packet for MC-LAG 22. Assuming that the packet includes such a SourceID value, router 18A may determine the source of the packet and determine how to forward the packet based on the source of the packet for MC-LAG 22. This may include determining whether to remove the SourceID value, e.g., assuming that router 18A is acting as the egress device for MC-LAG 22 (i.e., the device that ultimately forwards the packet to CE device 20).

On the other hand, when the packet was received from a device outside of the devices forming MC-LAG 22 (e.g., when the packet was received from router 17), router 18A adds data to the packet that identifies router 18A as a source of the packet for MC-LAG 22. The added data may further indicate an identifier of MC-LAG 22. For example, the added data may be a SourceID value, as discussed above. After adding the SourceID value, router 18A forwards the packet to another one of routers 18, that is, another device (chassis) of MC-LAG 22.

In this manner, routers 18 may avoid forwarding packets back to their sources within MC-LAGs, even when the MC-LAGs include more than two devices. For instance, assuming router 18A acted as the source of a packet for MC-LAG 22, the other routers 18 forming MC-LAG 22 avoid forwarding packets back to router 18A. For instance, as discussed above, routers 18 may prune respective spanning trees such that the spanning trees prevent routers 18 from forwarding packets back to sources of the packets for MC-LAG 22. Likewise, routers 18 may prevent network loops from forming among devices forming MC-LAGs, even when the MC-LAGs include more than two devices.

Figure 2:
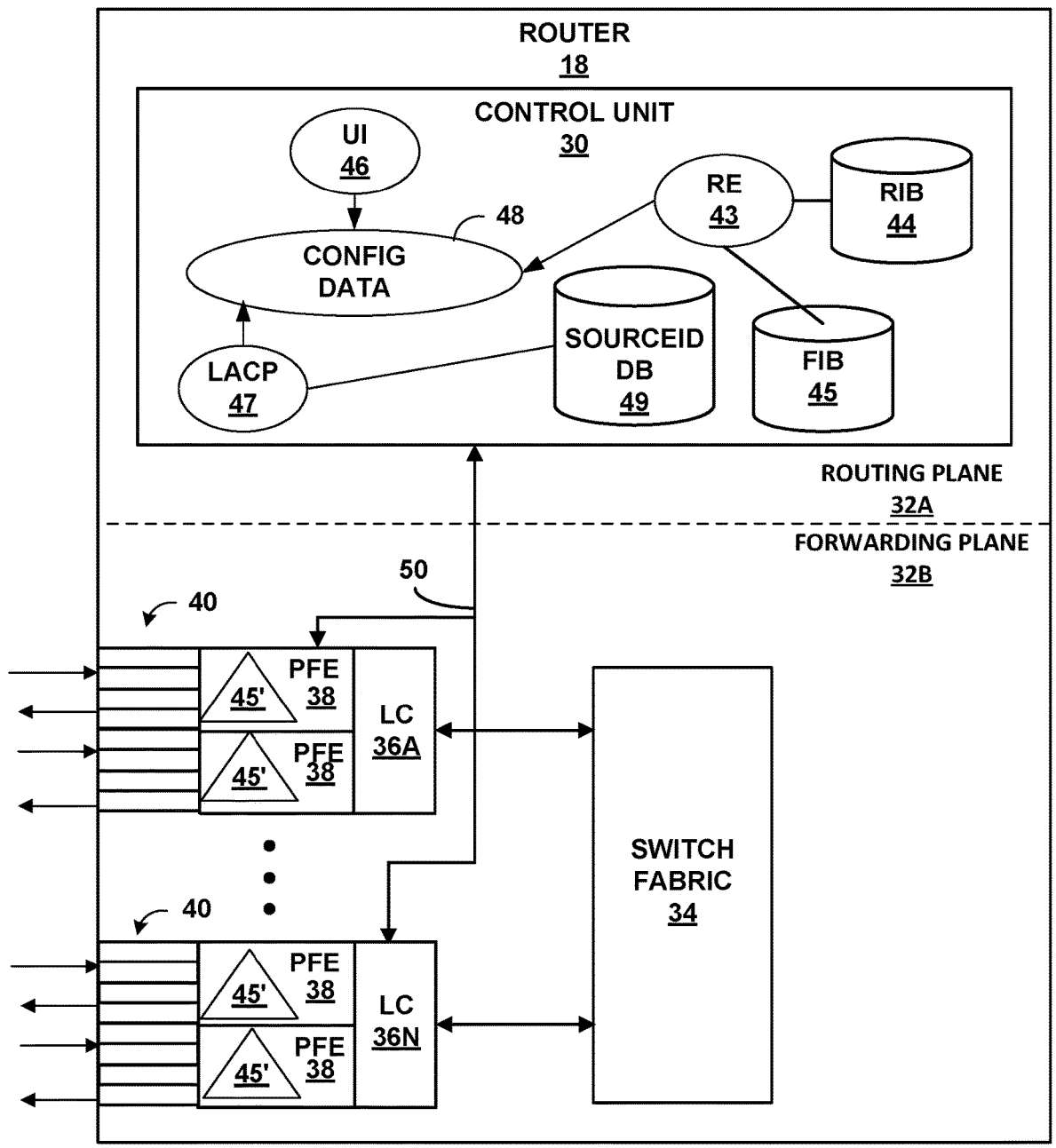
FIG. 2 is a block diagram illustrating an example of a router to which routers of FIG. 1 may conform.

FIG. 2 is a block diagram illustrating an example of a router to which routers 18 of FIG. 1 may conform. That is, each of routers 18 of FIG. 1 may include components similar to the components described with respect to router 18 of FIG. 2. Similarly, router 17 of FIG. 1 may also conform to router 18 of FIG. 2.

In the example of FIG. 2, router 18 includes a control unit 30 that provides control or routing plane functionality for router 18. In the example of FIG. 2, the routing plane is shown as routing plane 32A. Router 18 also includes switch fabric 34 interconnecting a set of line cards ("LCs") 36A-36N, each of which includes one or more packet-forwarding engines ("PFEs") 38 that send and receive traffic by a set of interface cards (IFCs) 40 ("IFCs 40") that typically have one or more physical network interfaces (ports). LCs 36, components thereof, and switch fabric 34 collectively provide a data plane (or forwarding plane) for forwarding network traffic, such as downstream and upstream subscriber traffic. This forwarding plane is shown as forwarding plane 32B in the example of FIG. 2. Although not shown in FIG. 2, PFEs 38 may each comprise a central processing unit (CPU), memory, and one or more programmable packet-forwarding application-specific integrated circuits (ASICs). Switch fabric 34 provides a high-speed interconnect for forwarding incoming data packets between PFEs 38 for transmission over a network, such as service provider network 14 shown in the example of FIG. 1.

Control unit 30 provides an operating environment for various protocols that perform routing plane functions for router 18. For example, control unit 30 may provide an operating environment for execution of a routing engine (RE) 43 ("RE 43") that implements a routing protocol to control L3 routing functions. In general, routing engine 43 receives and sends routing protocol messages to maintain a routing information based (RIB) 44 ("RIB 44") that stores L3 routing information representative of a topology of service provider network 14. Based on RIB 44, RE 43 generates a forwarding information base (FIB) 45 ("FIB 45") that stores forwarding data structures for installation within PFEs 38, e.g., by programming PFEs 38.

In the example of FIG. 2, control unit 30 includes a user interface ("UP") module 46 ("UI 46") with which an administrator interacts, either directly or by way of a provisioning system or software agent, to configure one or more logical interfaces corresponding to each of the active subscribers that own and operate customer network 16. UI 46 may receive commands in accordance with a command syntax and store these commands as configuration data 48 ("config data 48"). UI 46 may also receive commands to configure, for each of the logical interfaces, a primary scheduling module and one or more backup scheduling modules, also storing these commands as configuration data 48.

Control unit 30 includes a link aggregation control protocol (LACP) module 47 that operates to bundle one or more of interfaces 51 into MC-LAG 22 and treat bundle 22 as a single logical interface in terms of L2 forwarding. While shown as implementing LACP, control unit 30 may implement or otherwise provide an execution environment for any other type of aggregated bundle protocol capable of establishing aggregated bundles of logical and/or physical interfaces. LACP module 47 generally provides the abstraction to maintain MC-LAG 22.

Control unit 30 further includes SourceID database (DB) 49 that stores SourceID values, and corresponding values representative of identifiers for devices that initially receive packets for an MC-LAG and identifiers for the MC-LAGs. SourceID DB 49 may be configured as a relational database where the SourceID values act as key values. In this manner, the SourceID value, an identifier for a source of a packet for an MC-LAG, and an identifier for the MC-LAG may be stored as a triplet in SourceID DB 49, and each entry in SourceID DB 49 may conform to this triplet structure. In some examples, the SourceID value is a 16-bit value.

In the example of FIG. 2, control unit 30 is connected to each of LCs 36 by a dedicated internal communication link 50. For example, dedicated link 50 may comprise a Gigabit Ethernet connection for internal communication between the multiple components of router 18. In one example, control unit 42 communicates data representative of a software copy 45' of FIB 45 into PFEs 38 to program PFEs 38 and thereby control forwarding of traffic by the corresponding components within forwarding plane 32B. This allows the software FIB stored in memory (e.g., on-chip RAM) of in each of PFEs 38 to be updated without degrading packet-forwarding performance of router 18. In some instances, control unit 30 may derive separate and different software FIBs for each respective one of PFEs 38. In addition, one or more of PFEs 38 may include packet-forwarding ASICs (not shown) that PFEs 38 program with a hardware-copy of FIB based on the software FIBs (i.e., hardware versions of the software FIBs) copied to each respective PFE 38. In other, more complex examples, router 18 may have many more LCs 50 (e.g., 48 or 64 FPCs), each of which may have up to four PFEs 38 that each couple to up to sixteen interface cards 40.

In accordance with the techniques of this disclosure, when one of PFEs 38 receives a packet, the PFE may determine, from software copy 45' of FIB 45, whether the packet is to be forwarded according to an MC-LAG For instance, as discussed above, LACP module 47 may update configuration data 48 to indicate that packets having a particular network five-tuple (source IP address, destination IP address, source port, destination port, and protocol) are to be forwarded using MC-LAG Then, control unit 30 may update FIB 45 with data indicating that such packets are to be forwarded using MC-LAG, and moreover, updated software copies 45' of FIB 45 on PFEs 38 of LCs 36. Accordingly, when PFEs 38 receive a packet, PFEs 38 can determine whether the packet is to be forwarded using an MC-LAG When a packet is to be forwarded using an MC-LAG, the one of PFEs 38 that received the packet may further determine whether router 18 is the source of the packet for the MC-LAG; i.e., whether router 18 is the first chassis of the MC-LAG to have received the packet. If router 18 is the first chassis of the MC-LAG to receive the packet, the one of PFEs 38 that received the packet may add a SourceID value to the packet, e.g., based on data of SourceID DB 49. For instance, the SourceID value may be carried as an internal notification within an ingress chip (such as a chip of one of line cards 36) and can be used by other chips or modules of router 18, such as a filtering module, a destination lookup module, and an ingress processing module. In this manner, when a packet first enters an MC-LAG chassis (e.g., router 18), router 18 assigns the packet a SourceID using a lookup, e.g., on the packet's network 5-tuple. This SourceID value may encode an identifier for the MC-LAG as well as an identifier for the chassis on which the packet was received (e.g., router 18A).

The SourceID may be carried with the packet to an egress chip, e.g., a chip of one of line cards 36, which may be the same one of line cards 36 that received the packet. At the egress chip, an egress descriptor module and/or an egress rewrite module may use the SourceID, e.g., to forward the packet and, potentially, to remove or update the SourceID if necessary. When the packet has a SourceID value, whether the packet already had the SourceID value or whether router 18 added the SourceID value to the packet, router 18 may determine how to forward the packet based at least in part on the SourceID value. For example, FIB 45 (and, likewise, software copies 45' of FIB 45) may indicate a nexthop for a packet including a particular SourceID value. That is, FIB 45 may include a set of pairwise values {SourceID, local-port-number}, indicating a port by which to forward a packet including a particular SourceID. As another example, when router 18 is to forward the packet, router 18 may use the SourceID to determine a bit-vector of ports on which the packet is allowed to be transmitted. This check can include various other factors, such as lookup-type. When sending the packet to another chassis of the MC-LAG router 18 can write the SourceID value as an Ethernet tag in the outgoing packet, e.g., using a software-programmed EtherType value and a Rewrite template.

As discussed above, the SourceID value may be used to implement an MC-LAG with three or more chassis. However, the techniques of this disclosure may also be used when there are only two chassis for an MC-LAG In such a case, the SourceID value need not be sent with the packet when the packet is sent to another device of the MC-LAG However, the SourceID value may still be assigned and used within router 18. For instance, the SourceID value may be used when determining how to forward the packet, and removed prior to forwarding the packet.

The operating environment of control unit 30 may be implemented solely in hardware, or may be implemented as a combination of hardware and software or firmware. For example, control unit 30 may include one or more processors which execute software instructions. In that case, control unit 30 may include various software modules or daemons executing on an operating system, and may include a non-transitory computer-readable storage device, such as computer memory or hard disk, for storing executable instructions.

The architecture of router 18 illustrated in FIG. 2 is shown for exemplary purposes only. The disclosure is not limited to this architecture. In other examples, router 18 may be configured in a variety of ways. In one example, for example, some of the functionally of control unit 30 may be distributed within PFEs 38. Elements of control unit 30 may be implemented solely in software that executes on hardware, or hardware, or may be implemented as combinations of hardware and software or firmware. For example, control unit 30 may include one or more processors, one or more microprocessors, digital signal processors (DSPs), application specific integrated circuits (ASICs), field programmable gate arrays (FPGAs), network processors, or any other equivalent integrated or discrete logic circuitry, or any combination thereof, which execute software instructions. In that case, the various software modules of control unit 30 may comprise executable instructions stored, embodied, or encoded in a non-transitory computer-readable medium, such as a computer-readable storage medium, containing instructions.

Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other non-transitory computer-readable media. Computer-readable media may be encoded with instructions corresponding to various aspects of router 18, e.g., protocols. Control unit 30, in some examples, retrieves and executes the instructions from memory for these aspects.

Figure 3:
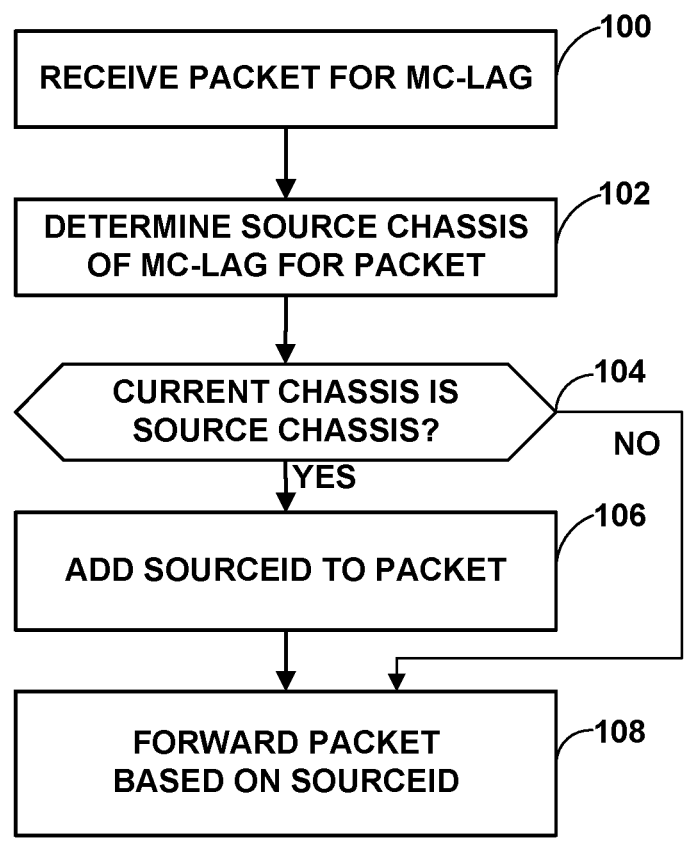
FIG. 3 is a flowchart illustrating an example method in accordance with the techniques of this disclosure.

FIG. 3 is a flowchart illustrating an example method in accordance with the techniques of this disclosure. The method of FIG. 3 is explained with respect to router 18 of FIG. 2. However, it should be understood that other devices may be configured to perform a similar method. It is assumed, in this example, that router 18 is one chassis of an MC-LAG including three or more chassis.

In the example of FIG. 3, router 18 initially receives a packet for an MC-LAG (100). That is, one of line cards 36 receives a packet, and one of PFEs 38 determines, using a respective software copy 45' of FIB 45, that the packet is to be forwarded using the MC-LAG For instance, the one of PFEs 38 may determine that the packet is to be forwarded using the MC-LAG using a SourceID value, if the packet includes a SourceID value, or using a network five-tuple {source IP address, destination IP address, source port, destination port, protocol} of the packet. Additional or alternative data for the packet may also be used to determine that the packet is to be forwarded using an MC-LAG Router 18 then determines a source chassis of the MC-LAG for the packet (102). That is, router 18 determines whether it is the first chassis of the MC-LAG to receive the packet or if the packet was originally received by a different chassis of the MC-LAG. For instance, router 18 may determine whether the packet includes a SourceID value, as discussed above. In this manner, router 18 may determine whether the packet was received from a device outside of the MC-LAG, such as router 17 (FIG. 1). In determining a source chassis of the MC-LAG for the packet, router 18 also determines whether it (i.e., the current chassis) is the source chassis (104).

In the case that router 18 (i.e., the current chassis) is the source chassis of the MC-LAG for the packet ("YES" branch of 104), router 18 adds a SourceID value to the packet (106). As discussed above, the SourceID value may be included in a 16-bit Ethernet tag of an Ethernet frame including an EtherType value indicating that the Ethernet frame can include tags (e.g., VLAN tags), and the SourceID value may be added in the form of a VLAN tag. The value of the VLAN tag corresponding to the SourceID, in this example, represents an identifier of the source chassis of the MC-LAG for the packet, as well as an identifier of the MC-LAG. In some examples, the one of line cards 36 that received the packet adds the SourceID value to the packet. In other examples, the forwarding information of FIB 45 may indicate that the packet is to be forwarded to an internal, dedicated SourceID-assigning unit (not shown in FIG. 2), which may receive the packet via switch fabric 34, add the SourceID value to the packet, and forward the packet to another one of line cards 36 via switch fabric 34.

After adding the SourceID value to the packet, or in the case that router 18 is not the source chassis ("NO" branch of 104) in which case the packet would already include a SourceID value, router 18 forwards the packet based on the SourceID (108). For instance, as discussed above, the SourceID may indicate a nexthop for the packet, e.g., in FIB 45. Alternatively, router 18 may use the SourceID to determine a bit vector corresponding to ports of router 18 by which router 18 may, or may not, forward the packet. For instance, the bit vector may include one bit per port of router 18, and a value of "1" for the bit may indicate that the port is to forward the packet, whereas a value of "0" for the bit may indicate that the port is not to forward the packet. In such an example, values of "0" may be assigned to bits corresponding to the port on which the packet was received and ports leading to destinations that the packet has already traversed. In some examples, all of the bits may be assigned a value of 0, e.g., when router 18 is not the designated forwarder. As yet another example, router 18 may use the SourceID to prune a spanning tree used to determine how to forward the packet. Forwarding the packet may include forwarding the packet to another chassis of the MC-LAG or to a device external to the MC-LAG, such as CE device 20. If router 18 forwards the packet to a device external to the MC-LAG, router 18 may remove the SourceID value from the packet before forwarding the packet.

In this manner, the method of FIG. 3 represents an example of a method including receiving, by a first chassis of a multi-chassis link aggregation group (MC-LAG) having three or more chassis, a packet to be forwarded using the MC-LAG, determining whether the packet was received from a device outside of the MC-LAG, when the packet was received from the device outside of the MC-LAG, adding data to the packet that identifies the first chassis as a source of the packet for the MC-LAG, and forwarding the packet.

Figure 4:
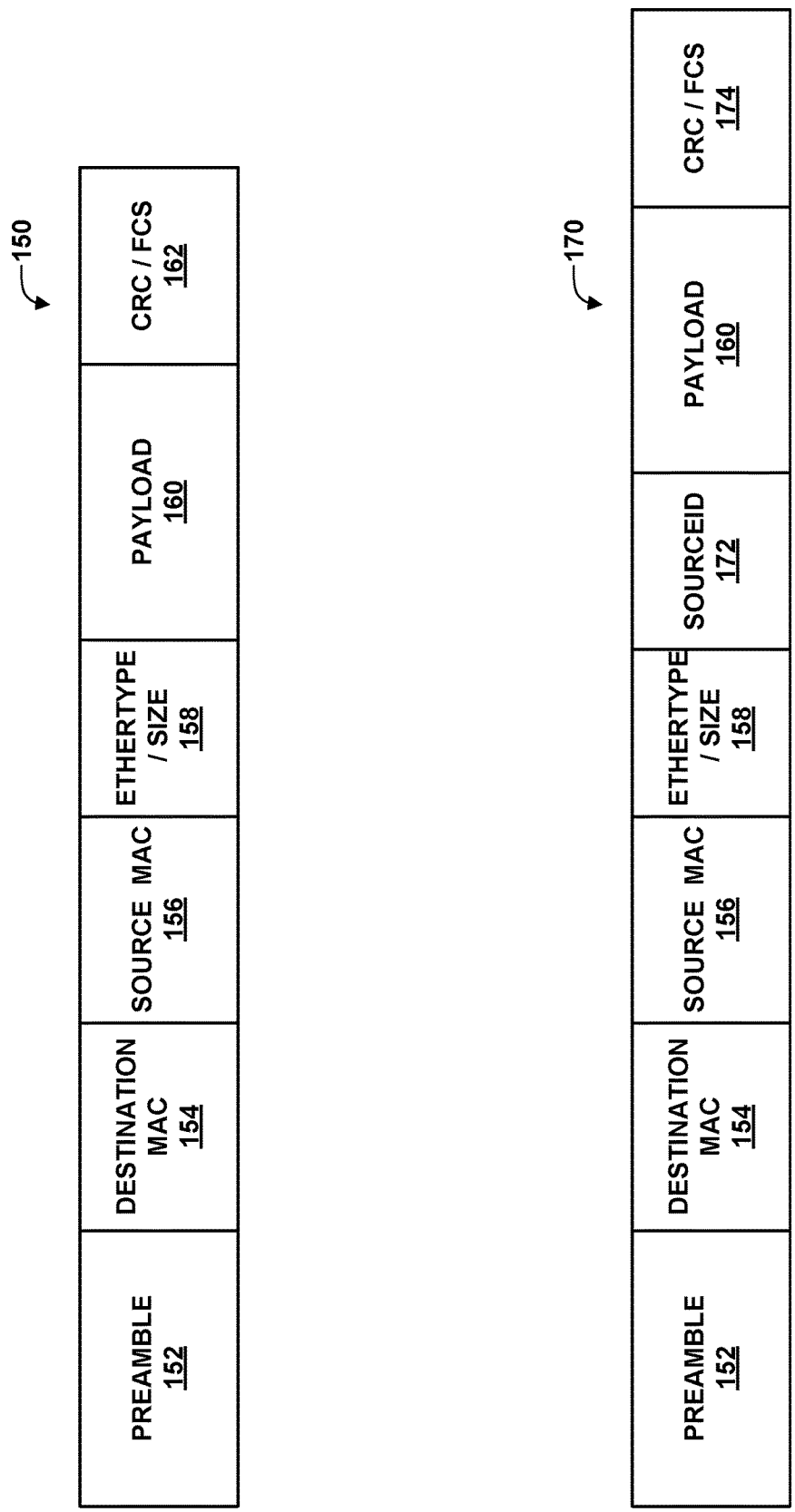
FIG. 4 is a conceptual diagram illustrating an example of an Ethernet frame 150 to which a SourceID value is added in accordance with the techniques of this disclosure.

FIG. 4 is a conceptual diagram illustrating an example of an Ethernet frame 150 to which a SourceID value is added in accordance with the techniques of this disclosure. In particular, a source chassis of MC-LAG 22 of FIG. 1 (e.g., router 18A) receives Ethernet frame 150. Ethernet frame 150 includes preamble value 152, destination media access control (MAC) value 154, source MAC value 156, EtherType/size value 158, payload 160, and cyclical redundancy check (CRC)/frame check sequence (FCS) data 162.

Preamble value 152 includes a 56-bit (7-byte) pattern of alternating 1 and 0 bits, which allows devices on the network to easily detect a new incoming frame. Destination MAC value 154 specifies a MAC address of a destination for Ethernet frame 150 (e.g., within customer network 16, while source MAC value 156 specifies a MAC address of a source for Ethernet frame 150 (e.g., within public network 12).

EtherType/size value 158 is a two-octet value that may be used to specify an EtherType to indicate which protocol is encapsulated in payload data 160 of Ethernet frame 150 and/or to specify a size of payload data 160 in octets.

Payload data 160 is the actual payload of Ethernet frame 150, e.g., including data for OSI model layers 3 and higher. Thus, payload data 160 also includes application-layer data.

CRC/FCS data 162 includes bits for a cyclical redundancy check. This check allows detection, and possibly correction, of corrupted data within Ethernet frame 150. That is, a device may be able to detect and potentially correct corrupted data of preamble value 152, destination MAC value 154, source MAC value 156, EtherType/Size value 158, and/or payload 160 using CRC/FCS data 162.

In accordance with the techniques of this disclosure, router 18A, assumed to be acting as a source chassis of MC-LAG 22 of FIG. 1, may add a SourceID value to a packet, e.g., an Ethernet frame, such as Ethernet frame 150. Ethernet frame 170 represents an example of an Ethernet frame resulting from addition of a SourceID value to Ethernet frame 150. In particular, in this example, router 18A adds SourceID value 172 to the header of Ethernet frame 150 to form Ethernet frame 170.

Router 18A may add SourceID value 172 in the form of a VLAN tag. For instance, SourceID value 172 may be a 16-big value. As discussed above, SourceID value 172 may represent an identifier of a source chassis (router 18A, in this example) of Ethernet frame 150 for MC-LAG 22. In addition, SourceID value 172 may represent an identifier of MC-LAG 22. After adding SourceID value 172 to the Ethernet frame, router 18A also recomputes the CRC value for Ethernet frame 170, and includes this recomputed CRC value as CRC/FCS data 174.

After router 18A forms Ethernet frame 170 by adding SourceID value 172 to Ethernet frame 150, router 18A forwards Ethernet frame 170 to another one of routers 18, to be forwarded according to MC-LAG 22. One of routers 18 acting as an egress chassis for MC-LAG 22 (e.g., the one of routers 18 that forwards the Ethernet frame to CE device 20) removes SourceID value 172 from Ethernet frame 170 and recalculates the CRC data, to reform Ethernet frame 150. Thus, the egress chassis for MC-LAG 22 forwards a frame that is the same as or corresponds substantially to Ethernet frame 150 to CE device 20.

In this manner, Ethernet frame 170 represents an example of a packet including data that identifies a chassis of an MC-LAG as a source chassis of the packet for the MC-LAG.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a first chassis of a multi-chassis link aggregation group (MC-LAG), a packet to be forwarded using the MC-LAG, the packet including layer 2 forwarding information including a source media access control (MAC) address, the chassis comprising switching or routing devices;
adding, by the first chassis, data to the packet that identifies the first chassis as a source of the packet for the MC-LAG, wherein adding the data comprises adding the data in addition to the layer 2 forwarding information, without modifying the layer 2 forwarding information, wherein adding the data to the packet comprises adding an Ethernet tag to the packet, wherein the packet includes an EtherType value indicating that the packet includes the Ethernet tag, and wherein the Ethernet tag includes a value representative of the first chassis as the source of the packet for the MC-LAG and an identifier of the MC-LAG; and
forwarding, by the first chassis, the packet, wherein forwarding comprises determining, by the first chassis, a port of the first chassis by which to forward the packet using a data structure that maps the added data to the port and forwarding the packet via the determined port.

2. The method of claim 1, wherein adding the data to the packet comprises adding a source identifier (SourceID) value to the packet.

3. The method of claim 1, wherein adding the data to the packet comprises adding data that identifies the MC-LAG.

4. The method of claim 1, wherein adding the data to the packet comprises adding the data based at least in part on a port of the first chassis from which the packet was received.

5. The method of claim 1, wherein forwarding comprises removing the added data from the packet prior to forwarding the packet.

6. The method of claim 1, wherein the data structure maps the added data and an identifier of the MC-LAG to the port, and wherein determining the port of the first chassis by which to forward the packet comprises determining the port of the first chassis from the added data and the identifier of the MC-LAG using the data structure.

7. A network device comprising a first chassis of a multi-chassis link aggregation group (MC-LAG), each of the chassis comprising switching or routing devices, the first chassis comprising:
one or more network interfaces configured to receive a packet to be forwarded using the MC-LAG, the packet including layer 2 forwarding information including a source media access control (MAC) address; and
a control unit comprising circuitry configured to:
add data to the packet that identifies the first chassis as a source of the packet for the MC-LAG, wherein the added data is in addition to the layer 2 forwarding information, and wherein the control unit is configured to add the added data without modifying the layer 2 forwarding information, wherein the control unit is configured to add an Ethernet tag to the packet, wherein the packet includes an EtherType value indicating that the packet includes the Ethernet tag, and wherein the Ethernet tag includes a value representative of the first chassis as the source of the packet for the MC-LAG and an identifier of the MC-LAG, and
forward the packet, wherein the control unit is configured to determine a port of the first chassis by which to forward the packet using a data structure that maps the added data to the port and to forward the packet via the determined port.

8. The network device of claim 7, wherein the control unit is configured to add a source identifier (SourceID) value to the packet.

9. The network device of claim 7, wherein the control unit is configured to add data that identifies the MC-LAG to the packet.

10. The network device of claim 7, wherein the control unit is configured to add the data to the packet based at least in part on a port of the one or more network interfaces from which the packet was received.

11. The network device of claim 7, wherein the data structure maps the added data and an identifier of the MC-LAG to the port, and wherein the control unit is configured to determine the port of the first chassis by which to forward the packet from the added data and the identifier of the MC-LAG using the data structure.

12. A non-transitory computer-readable storage medium comprising instructions that, when executed, cause a processor of a first chassis of a multi-chassis link aggregation group (MC-LAG), the chassis comprising switching or routing devices, to:
receive a packet to be forwarded using the MC-LAG, the packet including layer 2 forwarding information including a source media access control (MAC) address;

add data to the packet that identifies the first chassis as a source of the packet for the MC-LAG, wherein the added data is in addition to the layer 2 forwarding information, and wherein the instructions that cause the processor to add the data comprise instructions that cause the processor to add the data without modifying the layer 2 forwarding information, wherein the instructions that cause the processor to add the data to the packet comprise instructions that cause the processor to add an Ethernet tag to the packet, wherein the packet includes an EtherType value indicating that the packet includes the Ethernet tag, and wherein the Ethernet tag includes a value representative of the first chassis as the source of the packet for the MC-LAG and an identifier of the MC-LAG; and forward the packet, wherein the instructions that cause the processor to forward the packet comprise instructions that cause the processor to determine a port of the first chassis by which to forward the packet using a data structure that maps the added data to the port and to forward the packet via the determined port.

13. The computer-readable storage medium of claim 12, wherein the instructions that cause the processor to add the data to the packet comprise instructions that cause the processor to add a source identifier (SourceID) value to the packet.

14. The computer-readable storage medium of claim 12, wherein the instructions that cause the processor to add the data to the packet comprise instructions that cause the processor to add data that identifies the MC-LAG.

15. The computer-readable storage medium of claim 12, wherein the instructions that cause the processor to add the data to the packet comprise instructions that cause the processor to add the data based at least in part on a port of the first chassis from which the packet was received.

16. The computer-readable storage medium of claim 12, wherein the instructions that cause the processor to forward the packet comprise instructions that cause the processor to remove the added data from the packet prior to forwarding the packet.

17. The computer-readable storage medium of claim 12, wherein the data structure maps the added data and an identifier of the MC-LAG to the port, and wherein the instructions that cause the processor to determine the port of the first chassis by which to forward the packet comprise instructions that cause the processor to determine the port of the first chassis from the added data and the identifier of the MC-LAG using the data structure.

* * * * *